(12) United States Patent
Nishii

(10) Patent No.: US 6,513,640 B2
(45) Date of Patent: Feb. 4, 2003

(54) PALLET EXCHANGE APPARATUS

(75) Inventor: Koji Nishii, Nara-ken (JP)

(73) Assignee: Asuka Trading Co., Ltd., Nara-ken (JP)

( * ) Notice: Subject to any disclaimer, the term of this patent is extended or adjusted under 35 U.S.C. 154(b) by 57 days.

(21) Appl. No.: 09/735,897

(22) Filed: Dec. 14, 2000

(65) Prior Publication Data

US 2001/0004957 A1 Jun. 28, 2001

(30) Foreign Application Priority Data

Dec. 17, 1999 (JP) ............................ 11-359233

(51) Int. Cl.$^7$ ................................. B65G 47/00
(52) U.S. Cl. ................. 198/346.1; 29/33 P; 414/744.4; 414/223.01; 414/744.6
(58) Field of Search ............................ 414/744.3, 744.5, 414/744.2, 744.4, 744.6, 222.04, 223.01; 29/33 P, 563; 198/346.1, 346.3

(56) References Cited

U.S. PATENT DOCUMENTS

| | | | | |
|---|---|---|---|---|
| 3,986,617 A | * | 10/1976 | Blomquist | ......... 414/744.3 XV |
| 4,637,108 A | * | 1/1987 | Murata et al. | ..... 198/346.1 XV |
| 4,797,052 A | * | 1/1989 | Ohta et al. | ................ 414/744.3 |
| 4,934,031 A | * | 6/1990 | Maeda et al. | ...... 414/744.3 XV |
| 5,346,051 A | * | 9/1994 | Keith | ........................ 198/346.1 |
| 5,803,229 A | * | 9/1998 | Hosokawa | ................ 198/345.3 |
| 5,992,608 A | * | 11/1999 | Ahn | ......................... 198/346.1 |
| 6,148,988 A | * | 11/2000 | Lin et al. | .................. 198/346.1 |

FOREIGN PATENT DOCUMENTS

JP 3-60947 * 3/1991 ............ 414/223.01

* cited by examiner

*Primary Examiner*—Frank E. Werner
(74) *Attorney, Agent, or Firm*—Kubovcik & Kubovcik

(57) ABSTRACT

The present invention provides an apparatus provided with a turn driving device rotatable about an axis perpendicular to the plane of a pallet and also movable in the direction of the axis, a sliding device disposed on only the lower side of the pallet, and a push-up device having a first guide portion for causing the pallet normally separate from the sliding device to abut against the sliding device and further, guiding the direction of movement of the pallet, wherein during pallet exchange, the turn driving device turns the pallet on the sliding device and exchanges the pallet.

11 Claims, 6 Drawing Sheets

PALLET EXCHANGE APPARATUS

BACKGROUND OF THE INVENTION

1. Field of the Invention

This invention relates to a pallet exchange apparatus for exchanging the pallets of a machining side and a work exchange side in a machining apparatus such as a machining center.

2. Related Background Art

In a machining apparatus such as a machining center, there is known a pallet exchange apparatus having a pallet on each of a machining side and a work exchange side, and turning and exchanging these pallets by a turn driving apparatus in conformity with the requirement of the machining process. In such a machine, conventionally, a machining side pallet is installed on an XY table freely moved horizontally in the surface direction of that table to thereby effect machining. Heretofore, as the pallet exchange apparatus provided with such turn driving apparatus, there has been an apparatus of a type in which during machining, pallets are fixed so as not to move and during exchange, the pallets are raised by a turning apparatus and thereafter are turned and exchanged by the turn driving apparatus, or an apparatus of a type in which a sliding device such as bearings for exchanging pallets is arranged on not only areas beneath the pallets but also areas below the pallets, and the pallets are moved along the sliding devices and the pallets are exchanged.

Such apparatuses according to the prior art have suffered from the following problems.

(1) Since it is necessary to raise two pallets to be exchanged, a load sufficient to raise the weight of the two pallets has been necessary. To raise and turn the pallets, it is necessary to raise the pallets to a certain degree of height, but a considerably great load has been required to raise the pallets which are weight goods to that position.

(2) Further, oil pressure driving is generally used to raise the pallets, but a great quantity of oil has been required because the quantity to be raised is great.

(3) Since the XY table for machining is moved at random in a horizontal direction during machining, a pallet is disposed at a certain distance from a pallet to be exchanged. Therefore, in the pallet exchange apparatus of the type using the sliding devices such as bearings, it is necessary that the pallet be also moved by the sliding devices over this distance. Thus, the bearings or the like have unavoidably been disposed not only on the lower areas of the pallets but also on the outside areas of the pallets. Therefore, cut powder has been caught into the bearings or the like to hinder smooth movement.

(4) Particularly, the turn driving portion is disposed at a location on which the cut powder always falls, and this has led to the problem that the turn driving portion catches the cut powder into its mechanism.

SUMMARY OF THE INVENTION

The present invention provides a pallet exchange apparatus comprising turn driving means rotatable about an axis perpendicular to the plane of a pallet and also movable in the direction of the axis, sliding means disposed only on the lower side of the pallet, and push-up means having sliding means and contacting the sliding means to the pallet being off sliding means, and further guiding the direction of movement of the pallet, and during the exchange of the pallet, the turn driving means turns the pallet on the sliding means and exchanges the pallet, whereby the turning of the pallet can be made possible only by raising the pallet to a slight height and the problem of the load becoming great can be solved. Thereby, further, the quantity of oil may be small in the oil pressure driving for raising the pallet. Also, the necessary load becomes small, whereby it becomes possible to substitute an air oil booster for the oil pressure driving.

The pallet exchange apparatus of the present invention is further characterized in that the sliding means is provided on moving means movable in the direction of the plane of the pallet, and during the exchange of the pallet, the moving means approaches turning means and therefore, the sliding means can be disposed on only the lower side of the pallet. Thereby, the problem that cut powder falls on and is absorbed in the bearings can be solved.

The pallet exchange apparatus of the present invention is further provided with a cover having on the upper portion of the turn driving portion an inclined surface descending from the central portion thereof toward around it, and is characterized in that an insertion bar to transmit rotation force has an inclined surface coinciding with the plane of the cover during descent, and protrudes from the cover during ascent and therefore, the cut powder falling on the turn driving portion does not accumulate but can be dropped. Thereby, the cut powder can be prevented from being absorbed into the turn driving portion and hindering the driving.

DESCRIPTION OF THE PREFERRED EMBODIMENTS

Embodiment 1

Figure 1:
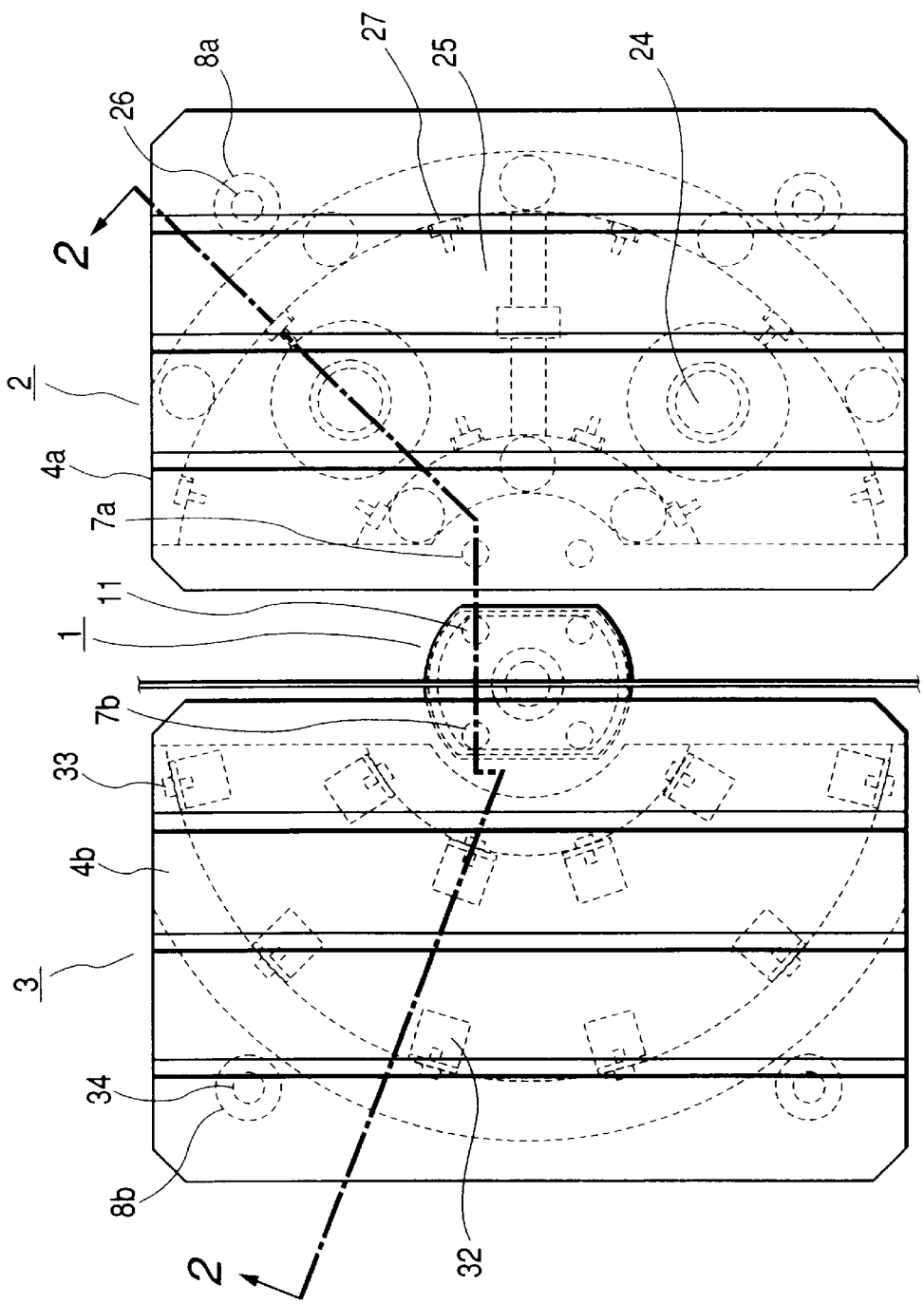
FIG. 1 is a top plan view of a pallet exchange apparatus in a state in which pallet exchange is not effected.
Figure 2:
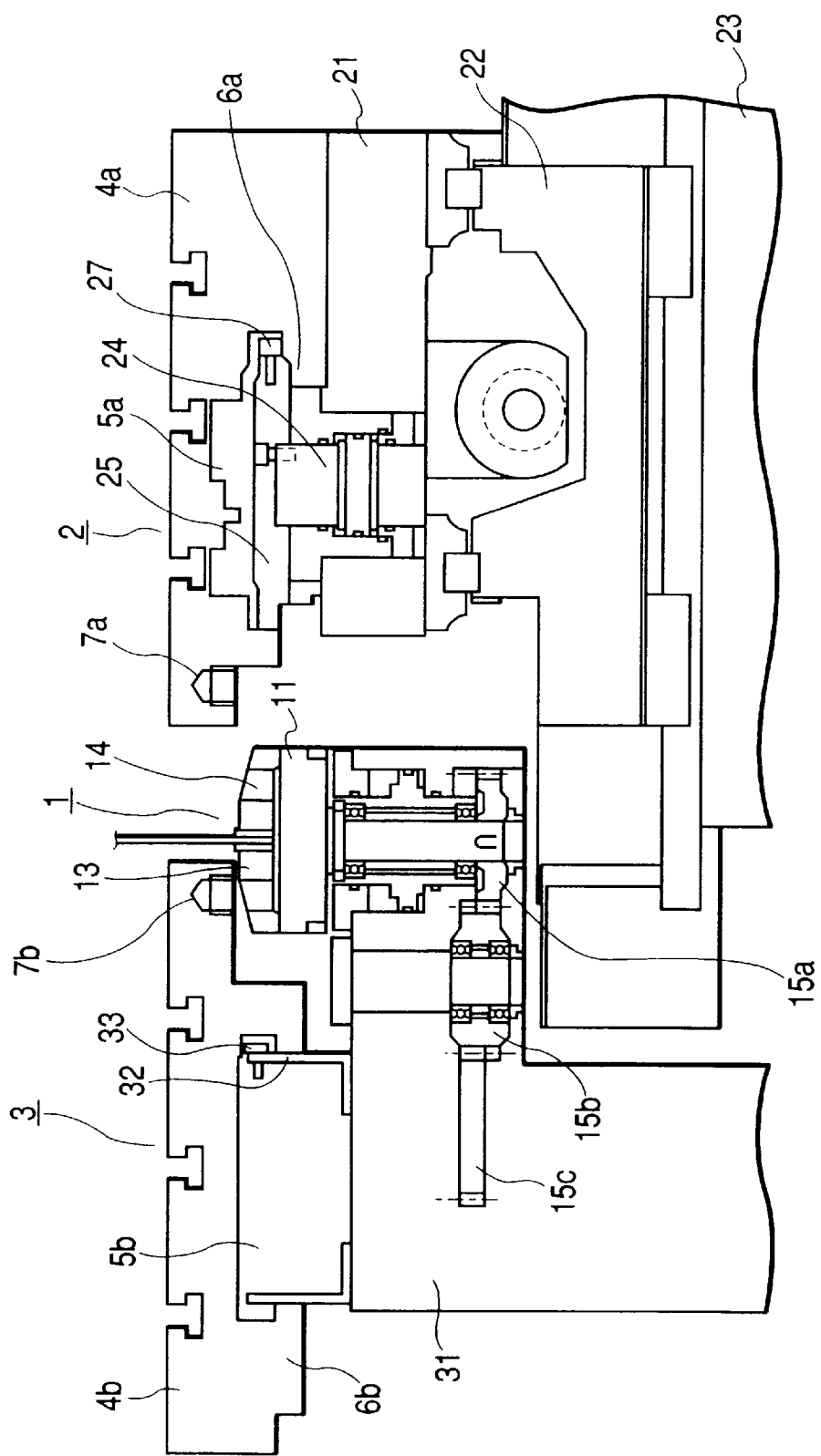
FIG. 2 is a side view of the exchange apparatus taken along the line 2—2 of FIG. 1.

A first embodiment of the present invention will hereinafter be described with reference to FIGS. 1 to 6. FIGS. 1 and 2 show a machining apparatus provided with the pallet exchange apparatus of the present invention, and more particularly, FIG. 1 is a top plan view thereof, and FIG. 2 is a side view taken along the line 2—2 in FIG. 1.

The pallet exchange apparatus of the machining apparatus comprises a turn driving portion 1, a machining side portion 2 and a work exchange side portion 3.

The turn driving portion 1 in turn comprises a sliding portion 11, a driving shaft 12 for turning pallets, an inclined cover 13, a round pin 14 and a partition cover 16.

The driving shaft 12 for turning pallets is rotatable about its axis and also is vertically movable. The sliding portion 11 is mounted on the upper end of the driving shaft 12 for turning pallets and is vertically movable in accordance with the driving shaft 12 for turning pallets. Driving gears 15a, 15b and 15c for turning are in meshing engagement with the lower end of the driving shaft 12 for turning pallets.

The inclined cover 13, as shown in FIG. 3, is mounted on the upper end portion of the turn driving portion and contains the sliding portion 11 therein. The inclined cover 13 has a surface of which the central portion is perpendicular to the driving shaft 12 for turning pallets, and has an inclined portion 13a extending therefrom toward the periphery thereof.

Figure 3A:
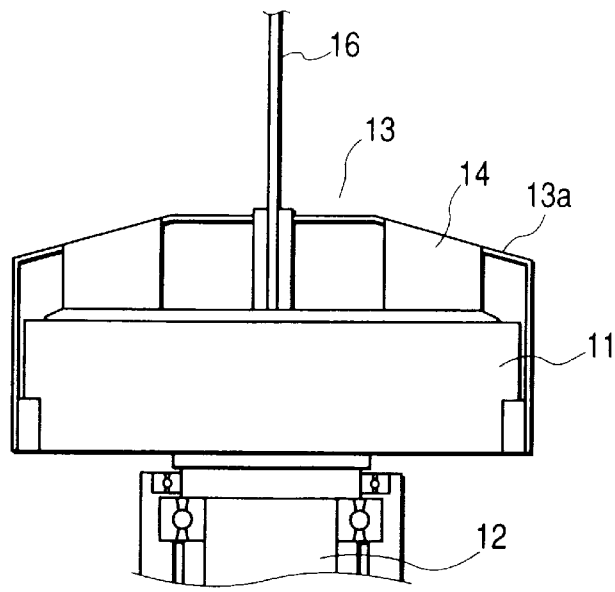
FIGS. 3A and 3B are enlarged views of the cover portion of a mechanical driving portion, FIG. 3A showing a state in which a sliding portion has descended, and FIG. 3B showing a state in which the sliding portion has ascended.
Figure 3B:
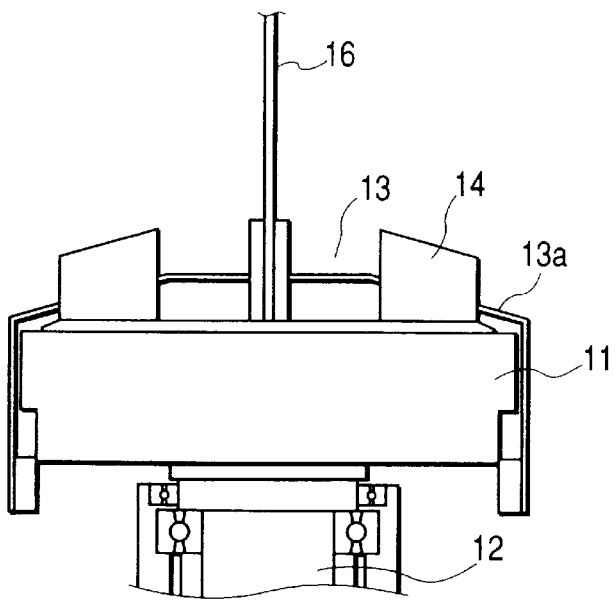

The round pin 14 is provided on the upper surface of the sliding portion 11, and is set so that the tip end of the round pin 14 may become flush with the surface of the inclined cover 13 when as shown in FIG. 3A, the sliding portion 11 is positioned at the lowermost end. Also, design is made such that when the sliding portion 11 ascends as shown in FIG. 3B, the round pin 14 protrudes outwardly from the surface of the inclined cover 13 in conformity therewith. While in the present embodiment, two round pins 14 are utilized for the respective pallets of the machining side portion 2 and the work exchange side portion 3, the cross section of the pins may be made polygonal. By changing the cross-sectional shape of the pins, it is also possible to improve the strength of the pins and decrease the number of the pins.

The partition cover 16 is also mounted on the upper surface of the sliding portion 11, and protrudes out of the central gap portion of the inclined cover 13. Accordingly, as the sliding portion 11 ascends or descends, the partition cover 16 also ascends or descends.

The machining side portion 2 comprises a pallet base 21, a saddle 22, a bed 23, a pallet clamp driving portion 24, a clamp plate 25 and pallet positioning pins 26.

Figure 4:
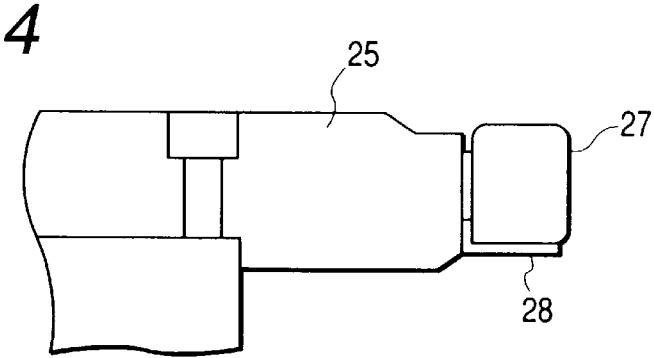
FIG. 4 is an enlarged view of the clamp plate bearing portion of a machining side portion.

The pallet clamp driving portion 24 is a driver disposed at the center of the machining side portion 2. The clamp plate 25 is mounted on the upper end of the movable portion of the pallet clamp driving portion 24. The pallet clamp driving portion 24 drives the clamp plate 25 so as to ascend and descend. Bearings 27 are embedded in the side of the clamp plate 25. The bearings 27 are mounted so that the rotary shafts thereof may be parallel to a plane perpendicular to the driving shaft 12 for turning pallets. FIG. 4 is an enlarged view of the clamp plate 25, and as shown in FIG. 4, the bearing 27 of the clamp plate 25 is disposed so that the rotation center portion thereof may be eccentric somewhat upwardly from the center axis in the direction of thickness of the clamp plate 25. Accordingly, as will be described later, in a case where a pallet 4a is disposed on the upper surface side of the clamp plate 25, when the clamp plate 25 is made to ascend, only the bearing 27 touches the inner surface of the pallet.

On the other hand, when the clamp plate 25 is made to descend, the bearing 27 does not touch the pallet, while the bearing 27 presses down the lower surface 6a of the pallet to fix the pallet by a holding-down portion 28.

On the other hand, the work exchange side portion 3 comprises a base portion 31, a pallet holding stand 32 provided on the base portion 31, and bearings 33 mounted on the pallet holding stand 32. The bearings 33, like the bearings 27 of the machining side portion, are mounted so that the rotary shafts thereof may be parallel to the plane perpendicular to the driving shaft 12 for turning pallets.

A machining side pallet 4a is placed on the upper portion of the saddle 22 of the machining side portion 2. A space portion 5a capable of containing the clamp plate 25 therein and a hold-down edge 6a are provided inside the machining side pallet 4a. The machining side pallet 4a is mounted so that the clamp plate 25 may be contained in this space. On the other hand, a work exchange side pallet 4b is a standby pallet to be exchanged, the work exchange side pallet being placed on the bearings 33 of the pallet holding stand 32 of the work exchange side portion 3. A space portion 5b capable of containing the pallet holding stand 32 and a hold-down edge 6b are also provided inside the work exchange side pallet 4b. The work exchange side pallet 4b is placed so that the holding stand 32 may be contained in the space portion 5b. The machining side pallet 4a and the work exchange side pallet 4b have interchangeability therebetween, and it is possible to place the work exchange side pallet 4b on the machining side portion 2 in the same fashion as the machining side pallet 4a, and on the other hand, it is also possible to place the machining side pallet 4a on the work exchange side portion 3 in the same fashion as the work exchange side pallet 4b.

Further, the plane formed by the bearings 27 of the machining side portion 2 is usually at a position lower than the plane formed by the bearings 33 of the work exchange side 3, and the levels of the planes formed by both of the bearings 27 and 33 are set so as to just coincide with each other when the clamp plate 25 has ascended. Also, the turning orbit of the machining side pallet 4a constituted by the row of the bearings of the machining side portion 2 and the turning orbit of the work exchange side pallet 4b constituted by the row of the bearings of the work exchange side portion 3 are designed to coincide with each other when the machining side pallet 4a moves to a predetermined position for pallet exchange which will be described later. Accordingly, when the clamp plate 25 has ascended, the machining side pallet 4a and the work exchange side pallet 4b can change their positions by the bearings 27 and 33 thereof.

The operation and effect of the present embodiment will now be described. During machining, the machining side portion 2 and the work exchange side portion 3 are spaced apart from each other as shown in FIGS. 1 and 2. At this time, the clamp plate 25 is in its lowered state, and the machining side pallet 4a is firmly pushed against the pallet base 21 by the pallet holding-down portion 28 of this clamp plate 25. Thereby, the machining side pallet 4a is fixed to the machining side portion 2. In order to accurately position the machining side pallet 4a relative to the saddle, the pallet positioning pins 26 are inserted in the positioning pin holes 8a of the machining side pallet 4a. Pallet fixing pins 34 are inserted in positioning pin holes 8b so that the work exchange side pallet 4b may not move on the pallet holding stand 32.

The machining side portion 2 is designed such that the saddle 22 is horizontally moved on the bed 23 in conformity with machining. Accordingly, a sufficient distance is kept between the machining side portion 2 and the work exchange side portion 3 so that they may not interfere with each other even if the saddle 22 is horizontally moved. However, since the distance is kept, it would occur to mind that cut powder produced by machining falls from the machining side pallet 4a onto the turn driving portion 1 and is lodged among the sliding portion 11, the driving shaft 12 for turning pallets, the round pins 14, etc. to thereby hinder driving, but in the present embodiment, the inclined portion 13a of the inclined cover 13 mounted on the turn driving portion 1 prevents the adherence of the cut powder to the driving portion 1 and the entry of the cut powder into the interior to thereby solve this problem. Particularly the upper ends of the round pins 14 are also inclined in conformity with the inclined portion 13a so that the cut powder may not remain thereon. Further, the partition cover 16 prevents the entry of the cut powder into the work exchange side portion 3.

Figure 5:
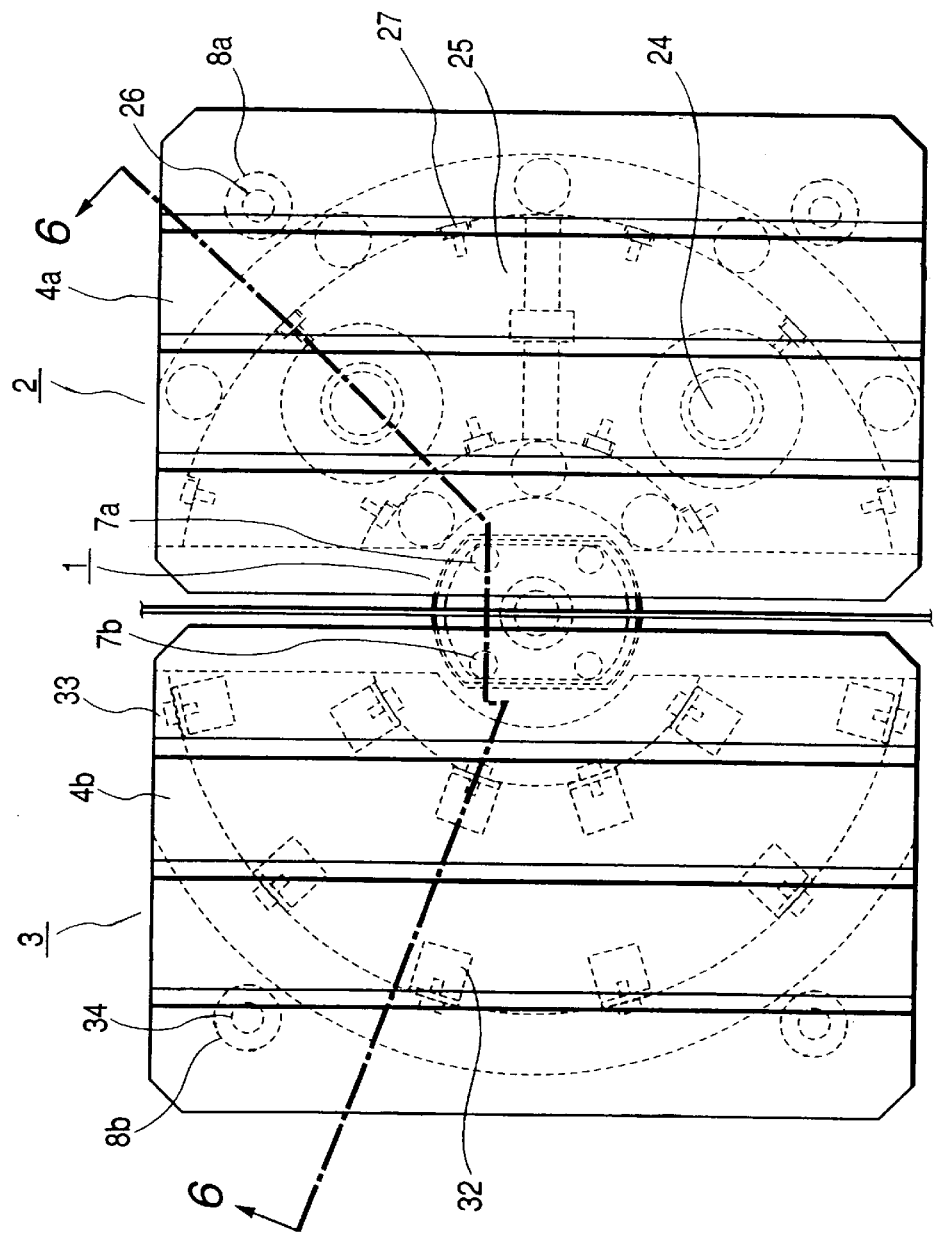
FIG. 5 is a top plan view of the pallet exchange apparatus in a state in which the machining side portion and a work exchange side portion have become close to each other to effect pallet exchange.
Figure 6:
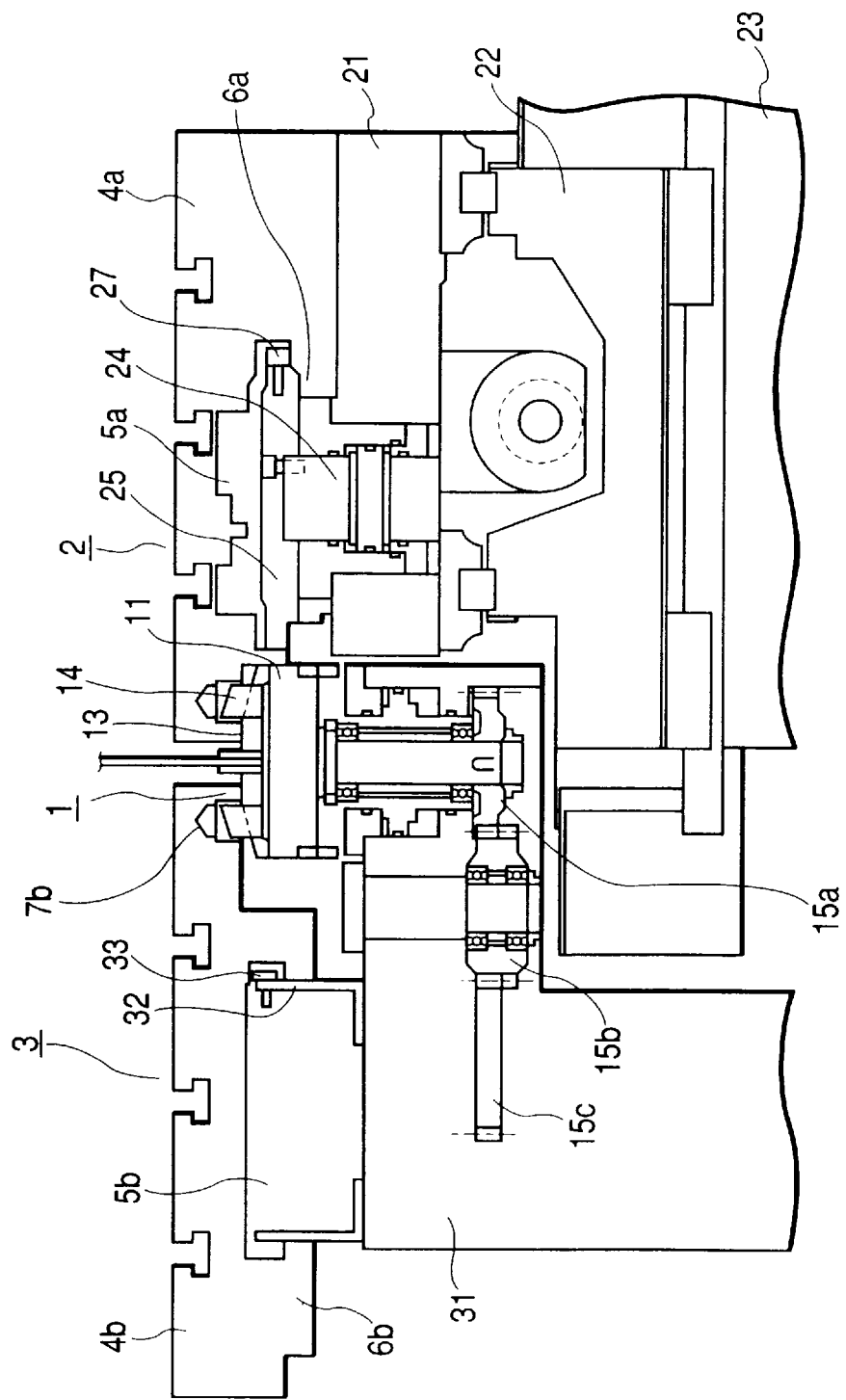
FIG. 6 is a side view of the exchange apparatus taken along the line 6—6 of FIG. 5.

During pallet exchange, the saddle 22 of the machining side portion 2 spaced apart from the work exchange side portion 3 as shown in FIGS. 1 and 2 is horizontally moved and approaches a predetermined position. This predetermined position is a position in which as shown in FIGS. 5 and 6, the horizontal positions of the round pins and the round pin holes coincide with each other so that the round pins 14 of the turn driving portion 1 can be inserted into the round pin holes 7a of the machining side pallet 4a. After or prior to the movement of the machining side portion 2 to the above-mentioned predetermined position, the clamp plate 25 of the machining side portion 2 raises the machining side pallet 4a until the plane of the bearings 27 comes to the same level as that of the plane of the bearings 33. The distance to which the clamp plate 25 raises the machining side pallet 4a can be freely set, but may be a distance wherein the machining side pallet 4a separates from the pallet base and therefore, a distance of about 1 mm is enough to achieve the purpose. With the ascent of the clamp plate 25, the pallet positioning pins 26 which have so far positioned the machining side pallet 4a descend and come out of the positioning pin holes 8a. On the other hand, the pallet fixing pins 34 which have so far positioned the work exchange side pallet 4b descend and come out of the positioning pin holes 8b.

In timed relationship with these series of operations, the sliding portion 11 of the turn driving portion 1 ascends with the driving shaft 12 for turning pallets. With this ascent, the tip ends of the round pins 14 protrude from the plane of the inclined cover 13 and are inserted into round pin holes 7a and 7b formed in the machining side pallet 4a and the work exchange side pallet 4b, respectively.

At this stage, the machining side pallet 4a and the work exchange side pallet 4b are both designed to be movable on and along the tracks formed by the rows of the bearings 27 and 33. Accordingly, when the driving shaft 12 for turning pallets is rotated, the round pins 14 transmit the turning force thereof to the machining side pallet 4a and the work exchange side pallet 4b, and in accordance therewith, the machining side pallet 4a and the work exchange side pallet 4b are turned about the driving shaft 12 for turning pallets on the bearings 27 and 33.

The driving shaft 12 for turning pallets is turned by 180° and the machining side pallet 4a and the work exchange side pallet 4b change their places with each other, whereafter the pallet positioning pins 26 are caused to ascend and are inserted into the pallet positioning pin holes 8b of the work exchange side pallet 4b moved to the machining side portion 2, while on the other hand, the pallet fixing pins 34 of the work exchange side portion 3 are inserted into the pallet positioning pin holes 8a of the machining side pallet 4a moved to the work exchange side portion 3. By these series of operations, the machining side pallet 4a and the work exchange side pallet 4b can be exchanged with each other.

Figure 7:
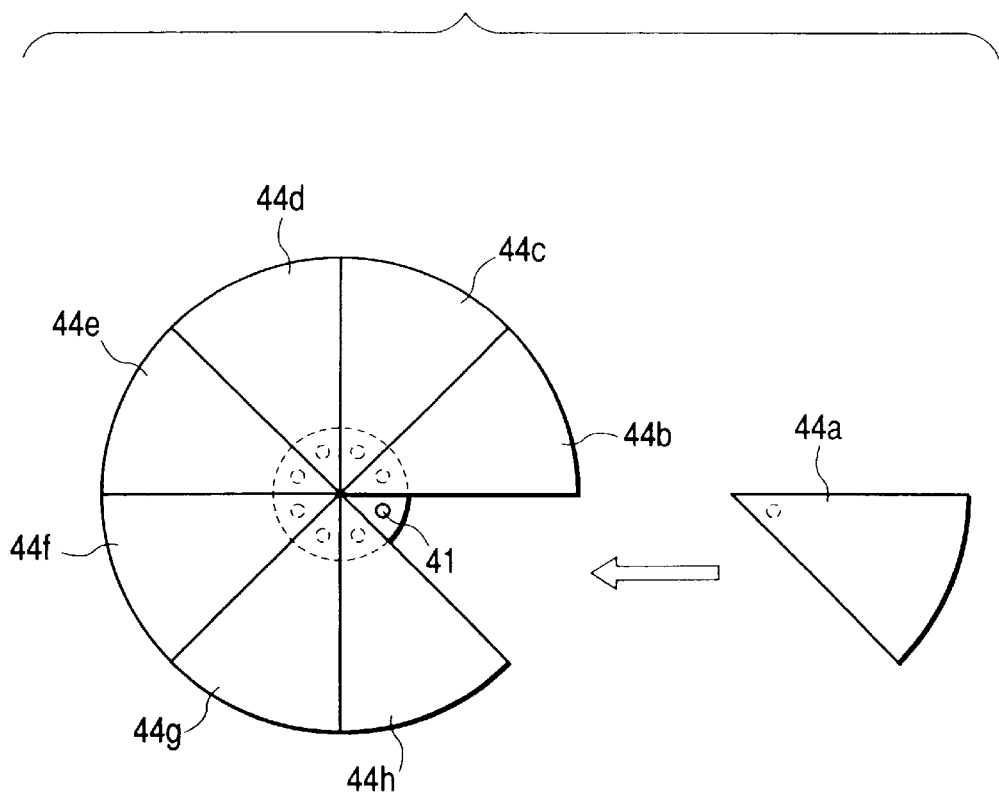
FIG. 7 is a conceptual view of the pallet exchange apparatus, when the present invention is applied, wherein the exchange of numerous pallets is to be effected.

Further, by adopting as a second embodiment construction pallets having portions of a circular pallet circumferentially equally divided as construction units as shown in FIG. 7, these pallets can be exchanged with one another as in the first embodiment. For example, work exchange side pallets 44b, 44c, 44d, 44e, 44f, 44g and 44h of the same shape as a machining side pallet 44a are prepared, and the pallet 44a is moved in the direction of arrow in FIG. 7 to thereby exchange the pallets by a turn driving apparatus 41.

As described above, unlike the prior art, not a driving shaft for turning but a clamp plate is used as means for raising pallets to exchange the pallets, whereby it has become possible to support the weight of the pallets by a large area. Thereby, a design rich in structural strength becomes possible. Accordingly, the driving shaft for turning can have a load necessary for the pallets to be turned on the bearings and therefore, the driving shaft for turning can also be made light in weight and compact.

Further, the clamp plate can be caused to ascend by only an amount corresponding to a slight height and therefore, the load and the quantity of oil necessary for oil pressure driving can both be reduced as compared with the prior art. Furthermore, not an oil pressure unit but an air oil booster may be used.

Further, inclinations are provided to the inclined cover 13 of the turn driving portion 1 and the tip ends of the round pins 14 and therefore, it is difficult for the cut powder to adhere.

Further, utilization is made of a contrivance in which in case of pallet exchange, the pallets are turned and exchanged after the machining side portion has approached the work exchange side portion and therefore, it is not necessary to dispose bearings on the other portions than the lower side of the pallets. Therefore, it never happens that the cut powder enters the bearings and hinders rotation.

What is claimed is:

1. A pallet exchange apparatus for exchanging a machining side pallet placed on a pallet base of a machining side of a machining apparatus and a standby pallet placed on first sliding means in the machining apparatus, comprising:

turn driving means rotatable about an axis perpendicular to the machining side pallet and the standby pallet;

second sliding means for moving the machining side pallet or the standby pallet thereon when the second sliding means contacts the machining side pallet or the standby pallet, the second sliding means being disposed only under the machining side pallet when the machining side pallet and the standby pallet have not been exchanged; and push-up means, when the machining side pallet and the standby pallet are exchanged, for bringing the second sliding means into contact with and pushing up the machining side pallet with the second sliding means so as to keep the machining side pallet off the pallet base;

wherein said turn driving means exchanges the machining side pallet and the standby pallet by turning the machining side pallet and the standby pallet about said axis.

2. A pallet exchange apparatus according to claim 1, further comprising a saddle movable horizontally, on which the pallet base is placed, wherein the machining side pallet is normally positioned apart from the standby pallet, and the machining side pallet moves horizontally to a predetermined position by movement of the saddle when the machining side pallet and the standby pallet are exchanged, and wherein a turning orbit of the machining side pallet by the second sliding means coincides with a turning orbit of the standby pallet by the first sliding means at the predetermined position so as to effect turning of the machining side pallet and the standby pallet around said axis.

3. A pallet exchange apparatus according to claim 2, wherein said push-up means is adapted to fix said machining side pallet onto the pallet base by pressing down a lower part of the machining side pallet when the push-up means does not push up the machining side pallet.

4. A pallet exchange apparatus according to claim 3, wherein said turn driving means includes a slidable member and pins, the pins being arranged at a top end of the slidable member and movable in a direction parallel to said axis with the slidable member, wherein the machining side pallet and the standby pallet respectively include holes, horizontal positions of the holes corresponds to horizontal positions of the pins at the predetermined position so that the pins can be inserted into the holes so as to transmit a turning force produced by the turn driving means during turning to said machining side pallet and said standby pallet.

5. A pallet exchange apparatus according to claim 4, wherein an upper portion of said turn driving means includes a cover having an inclined surface descending from a central portion thereof toward a periphery thereof, wherein each of said pins has an inclined surface coinciding with the inclined surface of said cover, and wherein the pins protrude from said cover when the pins are inserted into the holes.

6. A pallet exchange apparatus according to claim 5, wherein, when the push-up means does not push up the machining side pallet, the second sliding means is positioned lower than the first sliding means, and wherein, when the push-up means pushes up the, machining side pallet, the second sliding means is raised to the same height as the first sliding means so as to make a same height level plane with the first sliding means and second sliding means.

7. A pallet exchange apparatus for exchanging a machining side pallet placed on a pallet base of a machining side of a machining apparatus and a standby pallet placed on a first bearing in a machining apparatus, comprising:

a driving shaft having a first pin and a second pin at a top end, the driving shaft extending along an axis perpendicular to the machining side pallet and the standby pallet rotatable about the axis and being movable along the axis;

a clamp plate arranged below the machining side pallet and including a second bearing for moving the machining side pallet or the standby pallet when the second bearing contacts the machining side pallet or the standby pallet, the second bearing being disposed only under the machining side pallet and at an upper side of the clamp plate in case that the machining side pallet and the standby pallet are not exchanged; and a driver, when the machining side pallet and the standby pallet are exchanged, for moving the clamp plate in a direction parallel to said axis to bring the second bearing into contact with and push up the machining side pallet so as to keep the machining side pallet off the pallet base, wherein the machining side pallet has a first hole and the standby pallet has a second hole, wherein, when the machining side pallet and the standby pallet are exchanged, the first pin and the second pin are respectively inserted into the first hole and the second hole by movement of the driving shaft, and the machining side pallet and the standby pallet are exchanged by rotation of the driving shaft.

8. A pallet exchange apparatus according to claim 7, further comprising a saddle moveable horizontally, on which said pallet base is placed, wherein the machining side pallet is normally positioned apart from the standby pallet, and the machining side pallet horizontally moves to a predetermined position by movement of the saddle when the machining side pallet and the standby pallet are exchanged, wherein said insertion of the first pin and second pin into the first hole and the second hole is effected at the predetermined position, and wherein a turning orbit of the machining side pallet by the second bearing coincides with a turning orbit of the standby pallet by the first bearing at the predetermined position so as to effect turning of the machining side pallet and the standby pallet around said axis.

9. A pallet exchange apparatus according to claim 8, wherein said driver can move the clamp plate down, and the clamp plate presses down and fixes the machining side pallet onto the pallet base with a lower surface of the clamp plate when the driver does not push up the clamp plate.

10. A pallet exchange apparatus according to claim 9, wherein an upper portion of the driving shaft is covered by a cover including an inclined surface descending from a central portion thereof toward a periphery thereof, wherein each of the first pin and second pin has an inclined surface coinciding with the inclined surface of said cover, and wherein the first pin and second pin protrude from said cover when the pins are inserted into the holes.

11. A pallet exchange apparatus according to claim 10, wherein, when the clamp plate is not pushed up by the driver, the second bearing is positioned lower than the first bearing, and wherein, when the clamp plate is pushed up by the driver, the second bearing is raised to the same height as the first bearing so as to make a same height level plane with the first sliding means and second sliding means.

* * * * *